US006986961B1

(12) United States Patent
Ren et al.

(10) Patent No.: US 6,986,961 B1
(45) Date of Patent: Jan. 17, 2006

(54) FUEL CELL STACK WITH PASSIVE AIR SUPPLY

(75) Inventors: Xiaoming Ren, Los Alamos, NM (US); Shimshon Gottesfeld, Niskayuna, NY (US)

(73) Assignee: The Regents of the University of California, Los Alamos, NM (US)

( * ) Notice: Subject to any disclaimer, the term of this patent is extended or adjusted under 35 U.S.C. 154(b) by 653 days.

(21) Appl. No.: 10/119,892

(22) Filed: Apr. 10, 2002

Related U.S. Application Data

(60) Provisional application No. 60/315,827, filed on Aug. 29, 2001.

(51) Int. Cl.
*H01M 2/14* (2006.01)

(52) U.S. Cl. ............................ 429/38; 429/34; 429/30

(58) Field of Classification Search ................. 429/30, 429/34, 38, 39, 32, 40
See application file for complete search history.

(56) References Cited

U.S. PATENT DOCUMENTS

| | | | | |
|---|---|---|---|---|
| 5,804,326 | A | 9/1998 | Chow et al. | 429/26 |
| 6,255,012 | B1 | 7/2001 | Wilson et al. | 429/38 |
| 6,296,963 | B1 | 10/2001 | Nanjo | 429/38 |
| 6,299,996 | B1 | 10/2001 | White et al. | 429/22 |
| 6,322,915 | B1 | 11/2001 | Collins et al. | 429/13 |
| 6,413,664 | B1 | 7/2002 | Wilkinson et al. | 429/34 |
| 6,492,052 | B2 * | 12/2002 | Ren | 429/33 |
| 2002/0028372 | A1 * | 3/2002 | Ohlsen et al. | 429/40 |
| 2002/0106546 | A1 * | 8/2002 | Perry et al. | 429/34 |
| 2003/0082432 | A1 * | 5/2003 | Wilkinson et al. | 429/39 |

* cited by examiner

*Primary Examiner*—Raymond Alejandro
(74) *Attorney, Agent, or Firm*—Ray G. Wilson

(57) ABSTRACT

A fuel cell stack has a plurality of polymer electrolyte fuel cells (PEFCs) where each PEFC includes a rectangular membrane electrode assembly (MEA) having a fuel flow field along a first axis and an air flow field along a second axis perpendicular to the first axis, where the fuel flow field is long relative to the air flow field. A cathode air flow field in each PEFC has air flow channels for air flow parallel to the second axis and that directly open to atmospheric air for air diffusion within the channels into contact with the MEA.

9 Claims, 5 Drawing Sheets

FUEL CELL STACK WITH PASSIVE AIR SUPPLY

RELATED APPLICATIONS

This application claims the benefit of provisional patent application Ser. No. 60/315,827 filed Aug. 29, 2001.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to fuel cell stacks using hydrogen or methanol fuel, and, more particularly, to fuel cell stacks having a passive air supply.

BACKGROUND OF THE INVENTION

Polymer electrolyte fuel cells (PEFCs) have been developed for many applications, including low power applications that are now served by conventional batteries. PEFCs require a fuel supply, such as hydrogen or methanol, and an oxidant, which may be air. Early fuel cells required systems that provided fuel cell cooling and a pressurized and humidified air supply. These systems did not enhance the portability of PEFCs.

There are various portable power supplies, e.g., electrochemical batteries. However, batteries have a finite lifetime and cannot be recharged or regenerated in the field. Fuel cells can be readily resupplied with fuel and oxidant to provide a power supply for extended use. The usefulness of fuel cells could be greatly extended if a compact portable fuel cell was available.

The most desirable features of a portable power source are high power density, energy capacity, simple control system, convenient operation, low acoustic and thermal signatures, and ease of mass production. A passive air fuel cell system with hydrogen or methanol fuel can readily fulfill these requirements and offer significant advantage over the advanced batteries available today, especially in terms of the power density and energy capacity for long mission duration. The hydrogen/passive air fuel cell according to this invention is operated with ambient air naturally diffused to the fuel cell cathode. Since there are no pumps or other moving parts and energy consuming peripheral equipment involved in the system, system reliability and energy conversion efficiency are greatly enhanced. Also, because the air reactant transport to the electrode surface occurs by natural diffusion in the passive stack, an even reactant distribution among the cells can be more conveniently achieved than in a system using forced air feed.

Thus, for a passive air system, the control system can be greatly simplified or eliminated, and operation becomes more user friendly. Because of these merits, the passive air power systems have potential as portable power sources of choice for both military and commercial markets, especially for low power applications, where the overall system specific energy density requirement, as high as a few thousands watts per kg, does not permit the added weight of complicated auxiliary equipment and control systems. Indeed, the passive air fuel cell systems are much more like batteries in the sense of system simplicity and are more suitable for portable power applications.

U.S. Pat. No. 5,514,486 is directed to a passive ("air-breathing") portable PEFC where hydrogen fuel is supplied through a central annulus and air is supplied through diffusion along a radially directed porous flow field about the periphery of the device. The porous flow field acts to retain water reaction products in the cell to maintain hydration of the polymer electrolyte and to affect cooling of the cell. A drawback in the annular design is the limitation in the size of electrode area. As the electrode area is increased, the portion of the peripheral area from which oxygen from air diffuses readily to the electrode becomes small and stack performance suffers. The annular design provides greater energy than a conventional NiCad battery of similar size, but does not deliver power levels as high as NiCad batteries.

The present invention provides a portable fuel cell stack that has a high power density and does not require auxiliary equipment for the supply of reactants, i.e., hydrogen or methanol and oxygen from air. A rectangular cell geometry and an open air flow field permit good access of air to the air cathode and easy release of water which is the fuel cell reaction product. By limiting the losses arising from air cathode polarization in a passive air fuel cell stack, a high stack volume power density and high energy conversion efficiency can be achieved. The demonstrated power and energy conversion efficiency of a non-optimized testing stack discussed herein are already attractive for a wide range of military and commercial applications.

Various features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention includes a fuel cell stack having a plurality of polymer electrolyte fuel cells (PEFCs) where each PEFC includes a rectangular membrane electrode assembly (MEA) having a fuel flow field along a first axis and an air flow field along a second axis perpendicular to the first axis, where the fuel flow field is long relative to the air flow field. A cathode air flow field in each PEFC has air flow channels for air flow parallel to the second axis and that directly open to atmospheric air for air diffusion within the channels into contact with the MEA.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
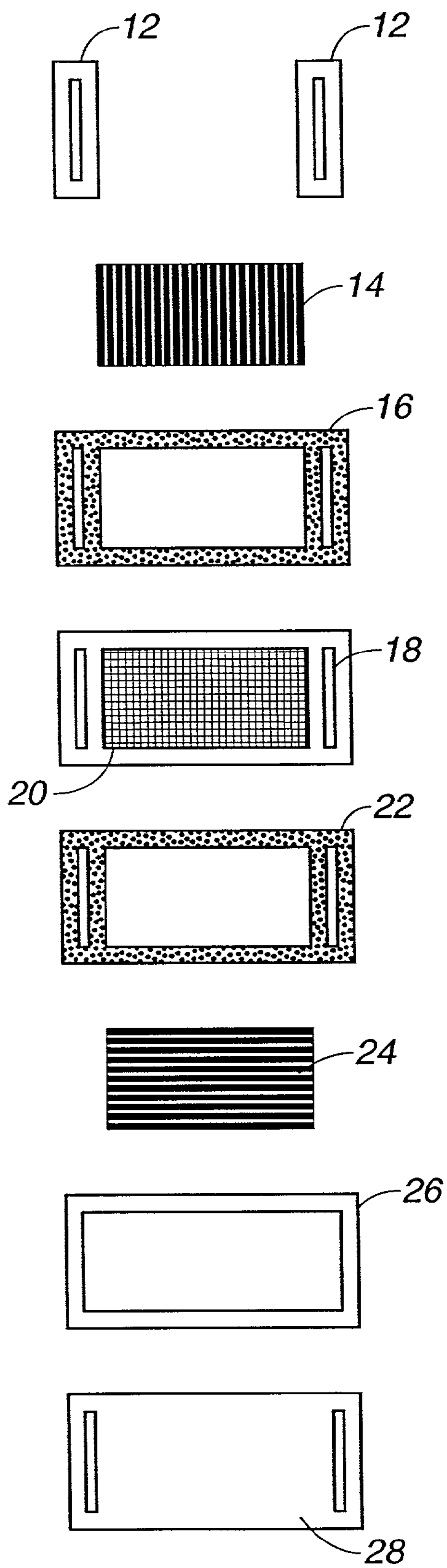
FIG. 1 is an exploded isometric view of a fuel cell according to one embodiment of the present invention.

In accordance with the present invention, power density and energy conversion efficiency in a fuel cell stack having a passive air supply are increased by the use of (1) an elongated electrode geometry, which shortens the length for atmospheric air to reach the center of air cathode electrode, and (2) open air cathode flow field, which enhances reactant air and product water transport. In the stack described herein, an air cathode flow field, described in U.S. patent application Ser. No. 09/472,388, incorporated herein by reference, now abandoned, is combined with an elongated rectangular geometry of the electrode. The air cathode flow field is a perforated corrugated design that permits both axial and lateral movement of reactant along the flow field In a preferred embodiment, the anode flow field is also provided with a perforated corrugated design. A uniform distribution of reactant and reaction products is obtained to maximize use of the fuel cell active electrode area.

The cell rectangular design is a particular feature of the present invention. The MEA defines a long axis and a short axis perpendicular to the long axis. An anode flow field is oriented with hydrogen or methanol flow channels "fuel channels" parallel to the long axis. A cathode air flow field is oriented with air flow channels parallel to the short axis. The air flow channels are open to the atmosphere at the two ends of each channel so that air can diffuse into the cell from both sides along the air flow channels. Hydrogen or methanol is provided to the fuel channels through manifolds that are internal to the fuel cell stack. Hydrogen may be supplied from a pressurized container or from a metal hydride storage system; methanol may be supplied as an aqueous solution.

The rectangular configuration provides a limited diffusion distance for air in the air flow channels so that adequate air is available along the MEA for reacting with fuel to provide a desired current density without incurring oxygen concentration polarization. The maximum rate of air diffusion flux per electrode area is related to the channel dimensions, i.e., the channel thickness and channel length. The length of the fuel flow field is then determined by total active electrode area required to provide the current and concomitant power output desired from the cell, i.e., the longer the fuel flow field, the greater total electrode area (with a fixed air channel length) and the total output current/power.

The approach to optimize the configuration of the cathode and anode flow fields, i.e., the length of the fuel channels, the length for air diffusion across the fuel channels, and the thickness of the air diffusion channels is based on (a) calculated estimates for the flow field thickness based on basic physical and electrochemical parameters and (b) optimizing around an estimate by experimentation.

A thickness for the cathode flow filed is estimated by calculating the rate of supply of oxygen from air by diffusion along the rectangular opening defined by the overall thickness of the flow field and the length of the fuel channels. The rate of oxygen supply should react sufficient oxygen to produce the electrical current demanded from an active area of the cell defined by the lateral dimensions of the cell. If the length of the fuel channels (long axis of the cell) is designated d', the length for air diffusion (short axis of the cell) (which is half the short axis dimension for two-sided air access), and the flow field thichkness by h, then the rate of oxygen supply needed by diffusion along the cathode is related to the current density J required from the fuel cell by:

$$\frac{h \cdot d' \cdot D \cdot C^o}{d} = \frac{J \cdot d' \cdot d}{4F}, \qquad \text{Eqn. 1}$$

where D is the diffusion coefficient of oxygen gas through nitrogen gas (0.219 $cm^2/s$ at 20° C. and 0.274 $cm^2/s$ at 60° C., with little effect from relative humidity), $C^o$ is the concentration of oxygen in air ($8.73\times10^{-6}$ $mol/cm^3$ at 1 atm and 20° C.) and F is the Faraday constant (96485 C/mol).

The thickness of the cathode flow filed is then calculated from Eqn. 1 to be:

$$h = \frac{Jd^2}{4 \cdot F \cdot D \cdot C^o}. \qquad \text{Eqn. 2}$$

For the exemplary cell dimensions set out below, d=1 cm and the value of h from Eqn. 2 for ambient air pressure and temperature is 1.3 mm (about 50 mil) at a current demand of 0.1 $A/cm^2$.

Figure 2:
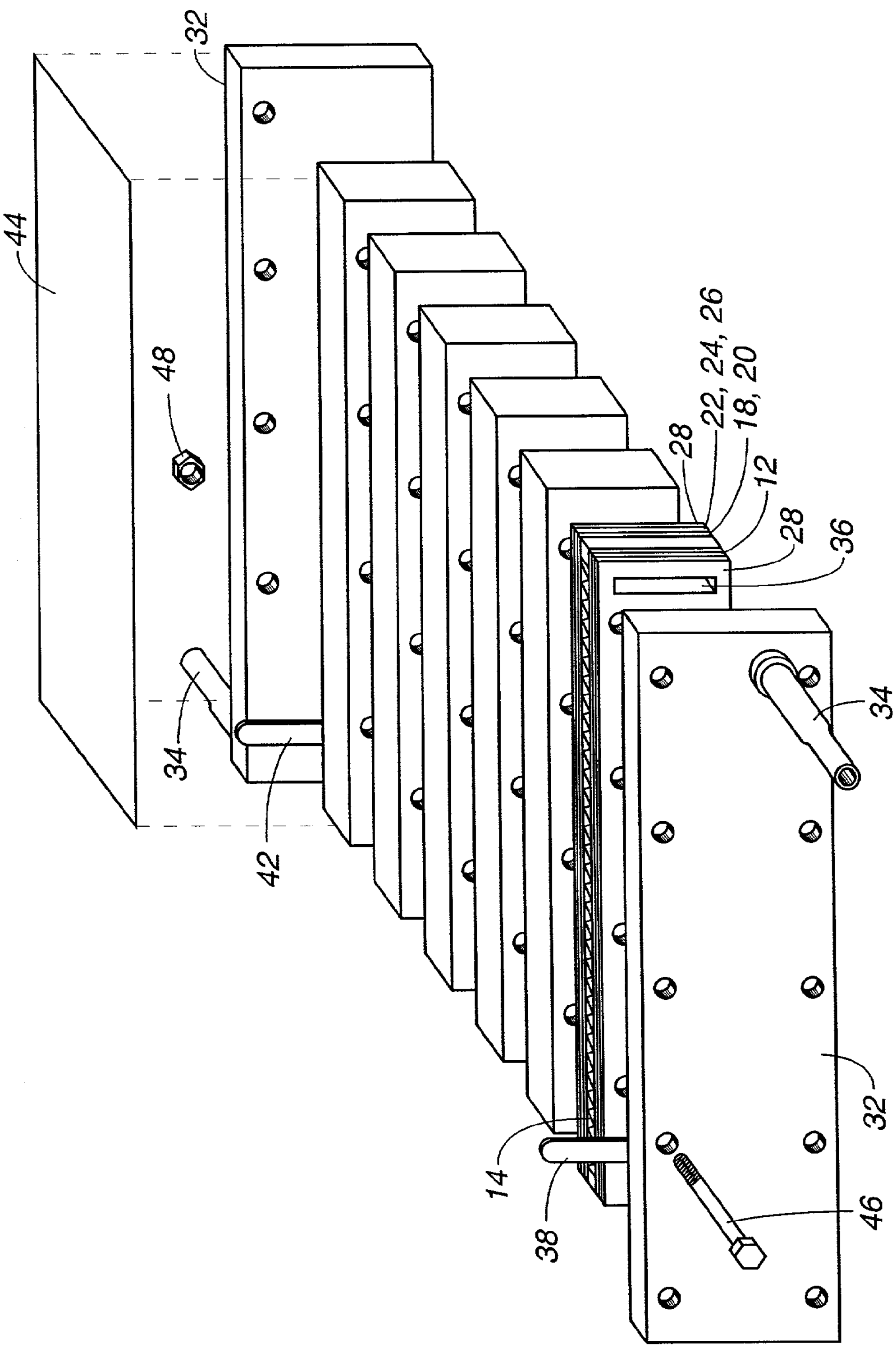
FIG. 2 is an exploded isometric view of a fuel cell stack incorporating the fuel cells shown in FIG. 1.

The value of h given by Eqn. 2 provides an initial estimate for the thickness of the cathode flow field required for effective oxygen supply through the edge of the stack, as shown in FIG. 2. The actual rate of oxygen supply along the flow field for some specific geometry will vary somewhat as a function of the degree of openness of the flow field, as well as the cell temperature and the possible presence of liquid water in the flow field. A more precise optimized thickness can be defined for a specific stack by testing stack performance as a function of the thickness of the cathode flow field, i.e., varying the thickness in experimental stacks in, e.g., a range of 0.5× to 2× the estimated thickness.

To maximize stack power density, one is looking within the above range for the minimum effective thickness of the cathode flow field, $h_{eff}$, identified experimentally as the minimum width providing the current demand at the same cell voltage (e.g., within 5–10 mV) as measured for a reference "face-breathing" cell, where the reference face-breathing cell is a single cell with the cathode opening directly to the air supply, i.e., the supply of air comes from a solid angle of 180°, and using the same MEA in the side-opening stack and operating under the same fuel feed conditions. The initial test results for operation in $H_2$/passive air mode demonstrate the potential of this design concept. The electrode area power density and stack package volumetric power density are 2 and 4 times higher than those described in previous reports by others, e.g., as shown by U.S. Pat. No. 5,514,486. Such a specific power density achieved by the passive air stack in accordance with the present invention is very suitable for small portable power applications.

FIG. 1 shows the components of a unit cell within the 6-cell $H_2$ passive air stack. This cell consists of a membrane electrode assembly 20 having a membrane, anode backing, and cathode backing; anode flow field 24 made by corrugating a piece of perforated metal sheet; cathode flow field 14 made by corrugating a piece of perforated metal sheet, cathode side frame 16, anode side frame 22; anode side gasket 26; cathode side gasket 12; and bipolar plates 28. MEA 20 is rectangular in shape, having a long axis for hydrogen fuel flow and a short axis for air diffusion, where the long axis is perpendicular to the short axis. In the exemplary embodiment, the length of the fuel flow field was 7.6 cm (long axis) and the length of the diffusion path was 2.6 cm, but neither of these dimensions has been optimized herein. MEA 20 is supported within MEA frame 18. The following detailed description of the components of the unit cell is meant to be exemplary and many different components might be used in place of the exemplary components, unless specifically noted.

Membrane electrode assembly (MEA) 20: The membrane component of MEA 20 was made by painting Pt ink directly on to both sides of a polymer proton conducting membrane, such as a polymer electrolyte membrane, perfluorosulfonate ionomer membrane, e.g., NAFION® 1135 (1100 E.W. and 3.5 mil thick) in particular, over a vacuum table heated at 60° C. The Pt ink was made by mixing Pt black powder (30 $m^2$ $g^{-1}$, Johnson Matthey) catalyst with 10 times the amount of water by weight first, and then with 2.2 times the amount of 5% N1200 E.W. ionomer solution (Solution Technology, Inc) by weight. The resulting composition of the dry ink is 90% Pt black and 10% of recast N1200 E. W. ionomer by weight. To obtain the best catalyst utilization during fuel cell operation, the electronic conducting phase (Pt) and protonic conducting phase (recast N1200 E. W. ionomer) form a thorough mixture so that the catalytic centers can be reached by reactants and connected to both electrode and membrane through the electronic and ionic conduction paths. Although an unsupported Pt catalyst was used here for demonstration, Pt supported on carbon particles can have a larger number of platinum atoms on the surface, thus with more active sites, on a unity Pt weight basis. Since the densities of supported catalysts change with the platinum loading level on carbon, the suitable amount of recast ionomer in the catalyst ink should be adjusted accordingly. Preferably, the volume ratio of the electronic conducting phase to the protonic conducting phase should be close to 1:1 MEA 20 includes:

Anode backing: E-tek 2.02 hydrophilic single sided carbon cloth backing (2.0×7.0 $cm^2$) was used to contact the anode side active area (2.0×7.0 $cm^2$) of the membrane.

Cathode backing: E-tek NC/DS/V2 hydrophobic carbon backing (2.0×7.0 $cm^2$) was used to contact the cathode side active area (2.0×7.0 $cm^2$) of the membrane.

Anode flow field 24: The anode flow field (7.6×2.0 $cm^2$) was made from a corrugated and perforated 4 mil 316 L stainless steel sheet. The folds and troughs of the corrugation were oriented along the long side of the MEA to channel $H_2$ gas or methanol solution from the two manifolds into the active electrode area. The thickness of the flow field channels defined by the folds and troughs was 28 mil (about 0.7 mm) and has not been optimized herein.

Cathode flow field 14: The cathode flow field (2.6×7.0 $cm^2$) was made from a corrugated and perforated 5 mil stainless steel sheet. The folds and troughs of the corrugation were oriented along the short side of the MEA to channel air from outside into the active electrode area. As with the anode field, the depth of the flow field channels defined by the folds and troughs is 28 mil and has not been optimized herein.

Supporting frames 16, 22: One 8 mil thick supporting frame was placed on each side of the MEA. The frame contained two small rectangular shaped openings (0.150×1.85 $cm^2$) to match the fuel manifolds, and one large rectangular shaped opening (2.0×7.0 $cm^2$) to match the active electrode area. The supporting frames were made of G-10 fiber reinforced plastics. The purpose and function of the supporting frame are to (1) frame around the backing and match the backing thickness so as to achieve dimensional uniformity and sealing when the stack is assembled and compressed, (2) support the silicon gasket by bridging over the troughs of the corrugated channels.

Anode side gasket 26 and cathode side gaskets 12: The gaskets were made from 32 mil thick 60 durometer silicon rubber sheet material. The compressed thickness of the gaskets in the assembled stack was 27 mil, and matched the thickness of the flow fields so as to achieve a good seal. Cathode side gaskets 12 were located parallel to airflow channels in cathode flow field 14 and did not cover the ends of the air flow channels. Anode side gasket 26 was formed as a frame around anode flow field 24 with side spacing to match the fuel manifold opening in anode side frame 22 and mating bipolar plate 28.

Bipolar plates 28: Each of the bipolar plates 28 was made from a piece of 2 mil thick 316 L stainless steel sheet, and contained two small rectangular shaped openings (0.150×1.85 $cm^2$) to match the fuel manifolds.

FIG. 2 is an exploded isometric view of a fuel cell stack incorporating six unit cells, as shown in FIG. 1. Each unit cell includes cathode side gasket 12; cathode flow field 14; MEA frame 18 with enclosed MEA 20; an assembly of anode side frame 22, anode flow field 24, and anode side gasket 26; and bipolar plates 28. The two bipolar plates 28 at the beginning and ending of the cell stack also serve as current collectors with current take-off tabs 38, 42. To electronically insulate the cell stack from endplates, a fiber reinforced Teflon tape (not shown) was placed at the inner face of each endplate 32. Each fuel manifold 36 on each side of plates 28 introduce/remove fuel from the anode flow fields 24, which have flow channels perpendicular to manifold 36 and parallel to the long axis of the unit cell, as discussed above.

As depicted in FIG. 2, cathode flow field 14 is oriented with the flow channels parallel to the short axis of MEA 20. The channels formed by the folds and troughs of flow field 14 are open to the atmosphere at the two ends of each channel so that air can diffuse into the channels along the cathode side of the MEA. The air diffusion length along the short axis of MEA 20 is relatively short so as to provide adequate oxygen flux availability throughout the diffusion length. Within the geometric limitation of an actual power device for practical consideration, the shorter the short axis, or the greater the air channel thickness, the higher the oxygen flux reaching per active cathode electrode area.

The unit fuel cells are sandwiched between end plates 32 and clamped using a plurality of bolts 46 with end nuts 48. If desired, an air filter 44 may be placed adjacent open air flow channel ends of cathode flow fields 14 (top and bottom of the stack) to keep particulate matter from forming flow obstructions in the flow channels. A suitable filter 44 is simply a porous polyethylene paper (15# Syntra™ 5507-AX, Lydall Manning Nonwovens, Lydall, Inc).

A fuel connection 34 is provided on each end plate 32. The fuel connections 34 are oriented so that the connections are diagonally located on the assembled fuel cell stack. A preferred orientation places the outlet connection at a location lower than the inlet location so that the water reaction product can readily flow from the stack.

Figure 3:
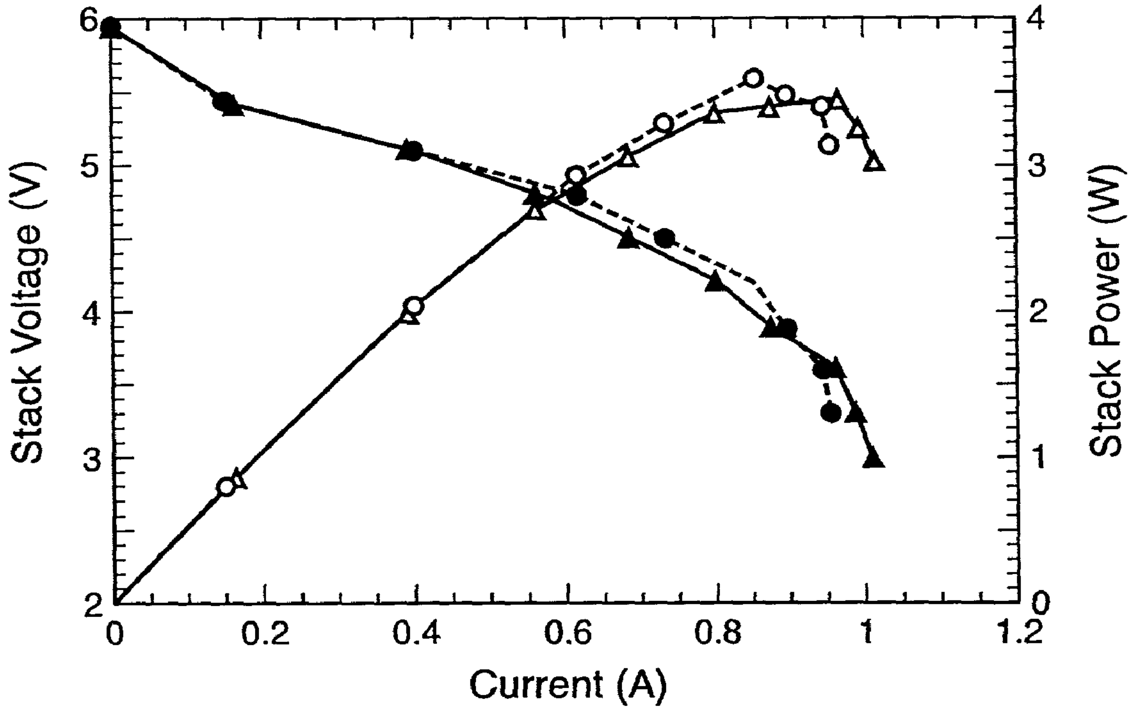
FIG. 3 graphically depicts the steady state performance of a six cell fuel cell stack having hydrogen feed and open to ambient air.

FIG. 3 depicts a steady state 6-cell $H_2$/passive air stack polarization curve (filled symbols) and the corresponding stack power output (open symbols). Hydrogen was fed to the anode inlet at 0.76 atm with cathode flow fields open to the atmosphere at 0.76 atm. The performance shown by solid line was obtained when the cathode flow field planes and channels were in vertical position, and the performance shown by dashed line was obtained when the cathode flow field planes and channels were in horizontal position. The stack reached a steady temperature of 37° C. when operated at 4.2 V or 0.7 V per cell for an extended period of time. The nearly identical performance curves show that the stack performance is insensitive to stack orientation. This result also shows that the convective flow of air within the cathode flow channels, as might be caused by a temperature gradient (a chimney effect) along a vertically orientated cathode flow channel, is small and negligible.

As shown in FIG. 3, at a current above 0.8 A a significant over-potential due to oxygen diffusion occurs. In the present design, neither the air nor the hydrogen channel heights defined by the corrugation folds and troughs were optimized (0.7 mm in height in the exemplary embodiment herein vs. 1.3 mm estimated from Eqn. 2). Also, by decreasing the hydrogen channel length and increasing the air channel length better oxygen diffusion may be provided. By doing so, the cell performance may be improved to move the design point to 60 mA $cm^{-2}$ at 0.75 V with the same cell package density. With forced air flow, a good cell can usually achieve 130 mA $cm^{-2}$ at 0.75 V under otherwise similar conditions.

Figure 4:
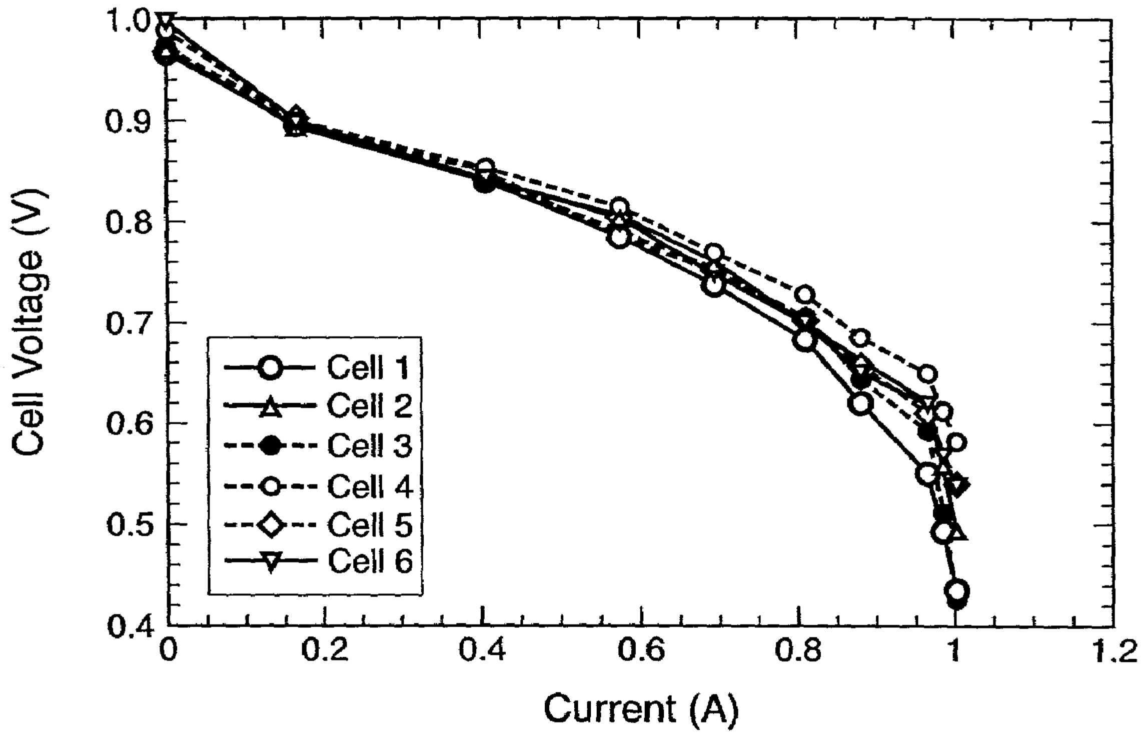
FIG. 4 graphically depicts polarization curves of individual cells in the fuel cell stack used to obtain the performance shown in FIG. 3.

FIG. 4 depicts polarization curves of the individual cells in the 6-cell $H_2$/passive air stack at the steady state conditions shown for FIG. 4. The individual cell performance at a current up to 0.8 A was relatively uniform across the stack. Cells in the center of the stack showed somewhat better performance than those close to the end plates, probably due to a higher cell temperature at the center of the stack.

Table A depicts the performance of an experimental 6-cell stack of hydrogen fuel cells with passive air flow and dead-end hydrogen at zero-psig back pressure.

TABLE A

Performance of a 6-cell Hydrogen Passive Air Stacks (Performance at 0.76 atm air)

| | |
|---|---|
| PERFORMANCE POINT: | 56 mA/$cm^2$ at 0.70 V |
| POWER DENSITY/ELECTRODE AREA: | 39 mW/$cm^2$ |
| $H_2$ TO ELECTRICITY CONVERSION | 18.76 W h/g $H_2$ |
| SYSTEM EFFICIENCY: | 57.4% |
| NUMBER OF CELLS: | 6 |
| ACTIVE ELECTRODE AREA: | 14 $cm^2$ |
| STACK CURRENT: | 0.8 A |
| STACK VOLTAGE: | 4.2 V |
| NET CONTINOUS POWER OUTPUT: | 3.4 W |
| CELL-STACK DIMENSIONS: | 2.6 × 8.5 × 1.1 $cm^3$ |
| CELL-STACK VOLUME: | 24.3 mL |
| CELL-STACK WEIGHT: | 37 g |
| VOLUMETRIC CELL-STACK-POWER DENSTIY: | 135 W/L (at 0.70 V/cell) |
| GRAVIMETRIC CELL-STACK POWER DENSTIY: | 92 W/kg (at 0.70 V/cell) |
| END PLATES WEIGHT: | 111 g (304 SS) |
| FITTING AND SCREW WEIGHT: | 13 g |
| TOTAL WEIGHT OF STACK: | 161 g |

The above stack performance was achieved with ambient (0.76 atm, at an elevation of 7200 ft. above sea level) air diffusion cathode. A performance enhancement over 25% is expected if the stack were to operate at sea level.
Cell-stack is the complete stack without endplates, fitting and screws.

The demonstrated performance of the 6-cell hydrogen/passive air stack compares favorably with that of a hydrogen/air-breathing fuel cell stack which has annular feed stack structure as described in U.S. Pat. No. 5,595,834 and No. 5,514,486 as the state of art. In these patents, the dimension of a projected 25 W (delivered at 0.5 V/cell with 40 cells) hydrogen-air stack with the maximum cell packing density is 6.4 cm in diameter and 8 cm long (not include endplates and bolts), or 257 $cm^3$ in volume. The stack according to the present invention will work at a much higher energy conversion point (61.5% vs. 42%) and still have a higher volumetric power density (135 W/L at 0.7 V/cell vs. 97 W/L at 0.5 V/cell).

Another drawback in the annular design is the limitation in the size of electrode area. As the electrode area is increased, for example beyond 13 $cm^2$ as shown in the patents, the portion of the peripheral area where oxygen diffuses readily to the electrode becomes a smaller fraction of the total electrode area and stack performance suffers. The stack according to the present invention has no such limitation. Consequently, the stack is designed by adjusting the number of cells and electrode area to match the voltage and power requirement for any given application.

Figure 5:
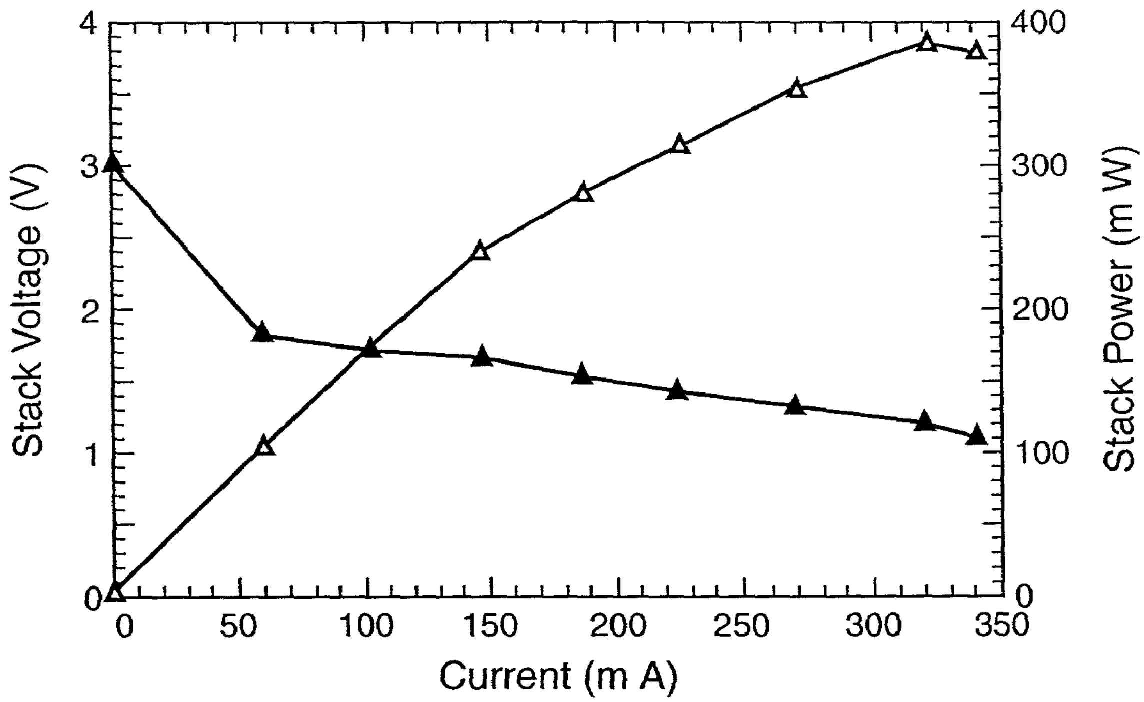
FIG. 5 graphically depicts the steady state performance of a six cell fuel cell stack having direct methanol feed and open to ambient air.

FIG. 5 depicts a steady state 6-cell direct methanol/passive air stack polarization curve (filled symbols) and the corresponding stack power output (open symbols). Direct methanol (0.3 M aqueous solution) was fed to the anode inlet at 3 mL/min with cathode flow fields open to the atmosphere at 0.76 atm. The fuel cell stack was identical to the stack used with hydrogen fuel, as shown and discussed for FIGS. 1 and 2. The relatively poor stack performance may be due to the use of Pt as the anode catalyst since Pt is not optimum for methanol electro-oxidation.

Table B depicts the performance of an experimental 6-cell stack of direct methanol (0.3 M methanol solution) fuel cells with passive air flow.

TABLE B

Performance of a 6-cell Direct Methanol Passive Air Stacks (Performance at 0.76 atm air)

| | |
|---|---|
| PERFORMANCE POINT: | 16 mA/$cm^2$ at 0.24 V |
| POWER DENSITY/ELECTRODE AREA: | 3.4 mW/$cm^2$ |
| NUMBER OF CELLS: | 6 |
| ACTIVE ELECTRODE AREA: | 14 $cm^2$ |
| STACK CURRENT: | 0.22 A |
| STACK VOLTAGE: | 1.42 V |
| NET CONTINOUS POWER OUTPUT: | 300 mW |
| CELL-STACK DIMENSIONS: | 2.6 × 8.5 × 1.1 $cm^3$ |
| CELL-STACK VOLUME: | 24.3 mL |
| CELL-STACK WEIGHT: | 37 g |
| VOLUMETRIC CELL-STACKPOWER DENSTIY: | 19.5 W/L (at 0.24 V/cell) |
| END PLATES WEIGHT: | 111 g (304 SS) |
| FITTING AND SCREW WEIGHT: | 13 g |
| TOTAL WEIGHT OF STACK: | 161 g |

The above stack performance was achieved with ambient (0.76 atm, at an elevation of 7200 ft. above sea level) air diffusion cathode.
Cell-stack is the complete stack without endplates, fitting and screws.

During the operation of a direct methanol fuel cell, a high level of water and methanol crossover through the polymer electrolyte membrane represents significant problems for the stack performance and for the water balance. The methanol crossover can be minimized to a large degree for a power system operated under a constant load by using an anode structure suitably designed, as taught by U.S. patent application Ser. No. 09/472,388, filed Dec. 23, 1999, now abandoned, and incorporated herein by reference.

Water balance between the anode and the cathode for a direct methanol fuel cell system may be maintained by utilizing the hydrophilic and hydrophobic properties of the anode and cathode backings. With a strong difference between a hydrophilic anode backing and a hydrophobic cathode backing, a static hydrodynamic pressure is established across the polymer electrolyte membrane, which pushes water from the cathode side to the anode side, and, thus, counters the water flux by electro-osmotic drag. Since the water flux produced by electro-osmotic drag is independent of the membrane thickness, while the water flux produced by hydrodynamic pressure is inversely proportional to the membrane thickness, a water balance can be more easily established with a thinner membrane.

Experimental results show that water balance in the 6-cell direct methanol/passive air stack taught herein was almost maintained internally and automatically, without resorting to an external process of water recovery and return from the cathode side to the anode side. The direct methanol/passive air fuel cell stack performance and the ability to maintain water balance internally demonstrate that direct methanol fuel cell power systems may be suitable as power systems for portable electronics where light weight, low cost, and simple control are important factors.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fuel cell stack comprising:

a plurality of polymer electrolyte fuel cells (PEFCs) where each PEFC includes:

a rectangular membrane electrode assembly (MEA) having an anode fuel flow field along a first axis and a cathode air flow field along a second axis perpendicular to the first axis, where the fuel flow field is long relative to the air flow field;

wherein the cathode air flow field has air flow channels for air diffusion parallel to the second axis and that directly open at each end to atmospheric air for air diffusion along the channels into contact with the MEA.

2. The fuel cell stack of claim 1, wherein the anode fuel flow field has fuel flow channels for fuel flow parallel to the first axis, where the fuel flow channels have a length effective to provide a selected power output from the stack.

3. The fuel cell stack of claim 1 wherein the cathode flow field is formed from a corrugated, perforated sheet of electronically conducting material for uniform air distribution over the MEA.

4. The fuel cell stack of claim 1, wherein the air flow channels of the cathode flow field have a thickness that is optimized about a thickness h determined by the relationship $$h = \frac{Jd^2}{4 \cdot F \cdot D \cdot C^o},$$

where J is the required fuel cell current density, d is half the air flow length, F is the Faraday constant, D is the diffusion coefficient of oxygen gas through nitrogen, and $C^o$ is the concentration of oxygen in air.

5. The fuel cell stack of claim 4, wherein the anode fuel flow field has fuel flow channels for fuel flow parallel to the first axis, where the fuel flow channels have a length effective to provide a selected power output from the stack.

6. The fuel cell stack of claim 4 wherein the cathode flow field is formed from a corrugated, perforated sheet of electronically conducting material for uniform air distribution over the MEA.

7. The fuel cell stack of claim 1, wherein the fuel is hydrogen gas.

8. The fuel cell stack of claim 1, wherein the fuel is a methanol aqueous solution.

9. The fuel cell stack of claim 8, further including a hydrophilic anode backing and a hydrophobic cathode backing.

* * * * *